(12) United States Patent
Liu

(10) Patent No.: US 9,535,406 B2
(45) Date of Patent: Jan. 3, 2017

(54) METHOD AND APPARATUS FOR GENERATING A REAL TIME ATTRIBUTE MARK OF A PICTURE

(71) Applicant: Weiou, Inc., Piedmont, CA (US)

(72) Inventor: Qiuyuan Liu, Piedmont, CA (US)

(73) Assignee: Weiou, Inc., Piedmont, CA (US)

( * ) Notice: Subject to any disclaimer, the term of this patent is extended or adjusted under 35 U.S.C. 154(b) by 0 days.

(21) Appl. No.: 14/749,845

(22) Filed: Jun. 25, 2015

(65) Prior Publication Data

US 2015/0378317 A1 Dec. 31, 2015

Related U.S. Application Data

(60) Provisional application No. 62/017,299, filed on Jun. 26, 2014.

(51) Int. Cl.
| | | |
|---|---|---|
| G04F 10/00 | (2006.01) | |
| H04L 9/32 | (2006.01) | |
| G06T 1/00 | (2006.01) | |
| G06K 9/62 | (2006.01) | |
| G06K 9/46 | (2006.01) | |

(52) U.S. Cl.
CPC ............ *G04F 10/00* (2013.01); *G06K 9/46* (2013.01); *G06K 9/6201* (2013.01); *G06K 9/6215* (2013.01); *G06T 1/0021* (2013.01); *H04L 9/3247* (2013.01); *H04L 9/3255* (2013.01)

(58) Field of Classification Search
None
See application file for complete search history.

(56) References Cited

U.S. PATENT DOCUMENTS

| | | | | |
|---|---|---|---|---|
| 5,765,176 A | * | 6/1998 | Bloomberg | G06T 11/00 345/634 |
| 2004/0225966 A1 | * | 11/2004 | Besharat | G06Q 10/109 715/705 |
| 2010/0124408 A1 | * | 5/2010 | Maeoka | H04N 5/765 386/329 |

* cited by examiner

*Primary Examiner* — Siamak Harandi
*Assistant Examiner* — Amandeep Saini
(74) *Attorney, Agent, or Firm* — Flener IP Law, LLC; Zareefa B. Flener

(57) ABSTRACT

A method for generating a real time attribute mark of a picture comprises: extracting a first time from picture data corresponding to the picture; obtaining a current time; calculating a time interval between the first time and the current time; and generating a real time attribute mark indicating the time interval. An apparatus for generating a real time attribute mark of a picture is also disclosed.

9 Claims, 14 Drawing Sheets

Authentic
601

0.75x
614

Cropped
616

Cut
618

1.5x
612

Change
622

Change 2
624

METHOD AND APPARATUS FOR GENERATING A REAL TIME ATTRIBUTE MARK OF A PICTURE

CROSS-REFERENCE TO RELATED APPLICATIONS

This application claims the benefit and priority of provisional application No. 62/017,299 filed on Jun. 26, 2014, which is incorporated herein in its entirety by reference.

TECHNICAL FIELD

The disclosed embodiments relate to a method and an apparatus for generating a real time attribute mark of a picture.

BACKGROUND

There are situations that one wants to view a picture and a real time attribute of the picture but is limited by the actions that he or she can take to check such a real time attribute. For example, when a user receives a picture which is displayed on the user's device while driving, for example a picture about an accident on the way ahead along which the user is driving, the user often wants to know the time interval from the time when the accident happened to now, for example five minutes or one hour, so as to determine whether he or she should change route to avoid possible traffic congestion.

In the prior art, a timestamp can be displayed on a picture to indicate the time when the picture was taken, for example 12:43 am 6/26/2014. However, in this way, in order to get the information of the time interval from the time when the accident happened to now, the user should find the timestamp on the picture, check the current time and calculate the difference of the time indicated by the timestamp and the current time. It is not convenient for a user, especially when the user is driving, a safety risk may arise.

SUMMARY

Embodiments of the present invention are directed to a method for generating a real time attribute mark of a picture.

Embodiments of the present invention are also directed to an apparatus for generating a real time attribute mark of a picture.

According to one or more embodiments of the present invention, there is provided a method for generating a real time attribute mark of a picture, comprising: extracting a first time from picture data corresponding to the picture; obtaining a current time; calculating a time interval between the first time and the current time; and generating a real time attribute mark indicating the time interval.

According to one or more embodiments of the present invention, there is provided an apparatus for generating a real time attribute mark of a picture, comprising: a first time extracting unit configured to extract a first time from picture data corresponding to the picture; a current time obtaining unit configured to obtain a current time; a time interval calculating unit configured to calculate a time interval between the first time and the current time; and a real time attribute mark generating unit configured to generate a real time attribute mark indicating the time interval.

Preferably, the first time is a picture taking time indicating when the picture was taken or created.

With the embodiments of the present invention, when a picture is to be displayed, a real time attribute mark indicating the time interval between the first time and the current time is generated and displayed visually, thus a user can get the information of the time interval directly and there is no need to check the current time and calculate the time period, which provides much convenience for the user. Especially under the situation that the user is driving, the user can get the information relating to the road conditions and safety with minimum distraction, so as to avoid possible safety risk for the user.

BRIEF DESCRIPTION OF DRAWINGS

These and other aspects will become apparent and more readily appreciated from the following description of the embodiments, taken in conjunction with the accompanying drawings in which.

DETAILED DESCRIPTION

Figure 1:
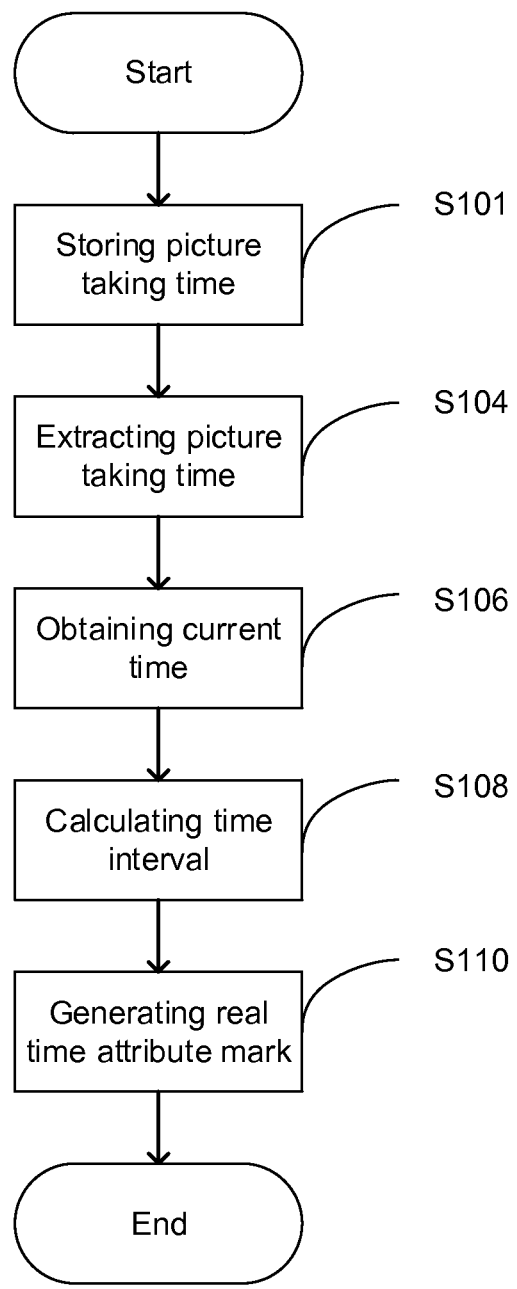
FIG. 1 is a flowchart illustrating a method for generating a real time attribute mark of a picture according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

FIG. 1 is a flowchart illustrating a method for generating a real time attribute mark of a picture according to an embodiment of the present invention.

As shown in FIG. 1, at step S101, after a picture was taken or created, a picture taking time indicating when the picture was taken or created is stored in picture data corresponding to the picture.

At step S104, when the picture is to be displayed, the picture taking time is extracted from the picture data corresponding to the picture.

Then, at step S106, a current time is obtained.

At step S108, a time interval between the picture taking time and the current time is calculated by subtracting the picture taking time from the current time.

Lastly, at step S110, a real time attribute mark indicating the time interval is generated.

In an embodiment, the real time attribute mark further indicates the picture taking time or the current time or both of them.

Figure 2A:
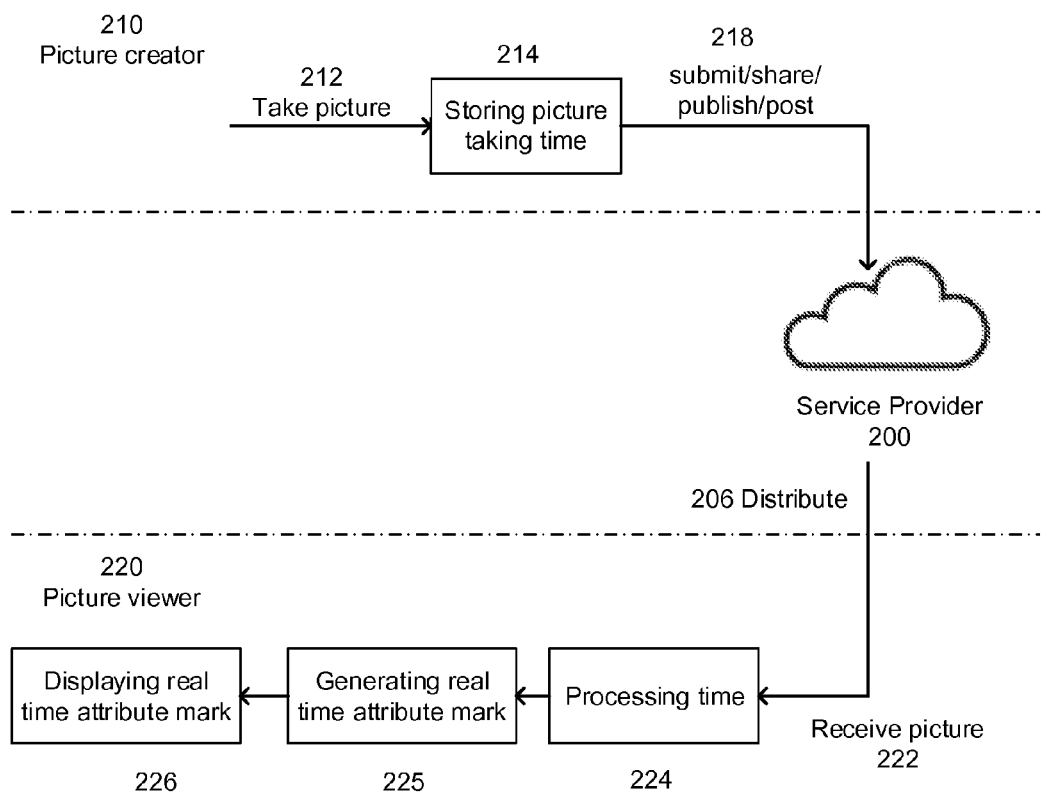
FIG. 2(a) is a schematic drawing illustrating a process of displaying a real time attribute mark of a picture according to an embodiment of the present invention.

FIG. 2(a) is a schematic drawing illustrating a process of displaying a real time attribute mark of a picture according to an embodiment of the present invention. As shown in FIG. 2(a), there are 3 parties: a picture creator 210, a picture viewer 220 and a service provider 200. The picture creator 210 takes 212 a picture, the picture taking time is stored 214 in a picture file corresponding to the picture, and the file is submitted, or shared, or published, or posted 218 to the service provider 200. The service provider 200 distributes 206 the picture to the picture viewer 220. The picture viewer 220 receives 222 the picture, processes 224 the time information, including extracting picture taking time stored in the picture file, obtaining current time and calculating the time interval as described in FIG. 1, generates 225 the real time attribute mark and displays 226 the real time attribute mark together with the picture.

In an embodiment of the present invention, the picture is taken by any device that's capable of taking a picture, for example, a computer, a camera, a camcorder, a phone, digital glasses, or a tablet, etc., or the picture is created by any device that's capable of creating a picture, a drawing, a painting, or a computer-generated image, for example, a computer, a phone, or a tablet, etc. In an embodiment of the present invention, the picture taking device is capable of sending a picture file to a service provider.

In an embodiment of the present invention, the picture is displayed by any device that's capable of receiving a picture file, processing time, and displaying a picture, for example, a computer, a camera, a phone, digital glasses, a tablet, a TV, or an in-car head unit etc. In an embodiment of the present invention, the picture taking unit and the picture displaying unit are in different parties, or devices, or apparatus, or computer programs as illustrated in FIGS. 2(a)-2(c).

Figure 2B:
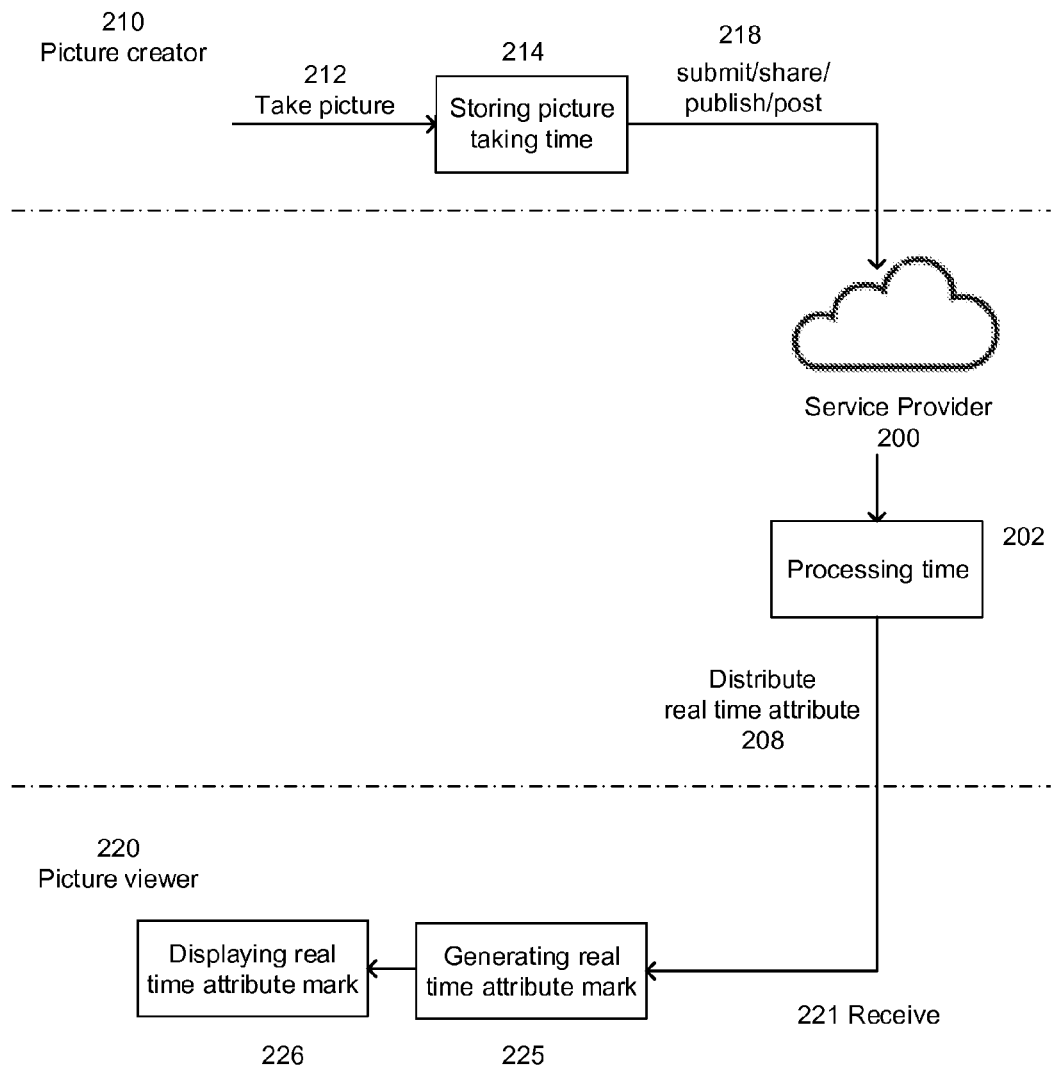
FIG. 2(b) is a schematic drawing illustrating a process of displaying a real time attribute mark of a picture according to another embodiment of the present invention.

FIG. 2(b) is a schematic drawing illustrating a process of displaying a real time attribute mark of a picture according to another embodiment of the present invention. What's different from FIG. 2(a) is time processing 202 is done by the service provider 200 instead of the picture viewer 220. After processing 202 time, the service provider 200 distributes 208 real time attributes including the picture taking time, the current time and the time interval, and the picture to the picture viewer 220. The picture viewer 220 receives 221 the picture and the real time attributes, generates 225 the real time attribute mark and displays 226 the real time attribute mark together with the picture.

Figure 2C:
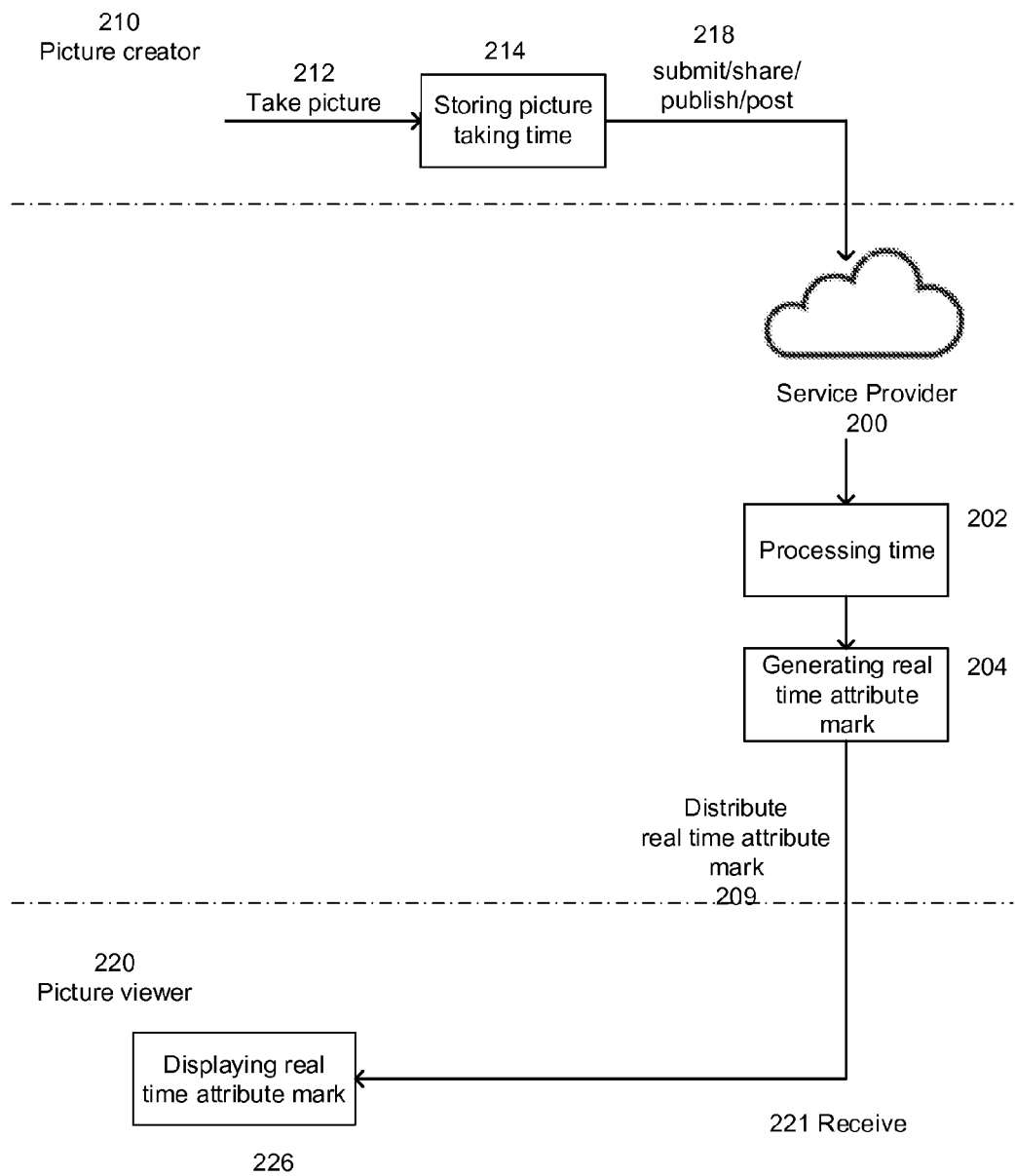
FIG. 2(c) is a schematic drawing illustrating a process of displaying a real time attribute mark of a picture according to still another embodiment of the present invention.

FIG. 2(c) is a schematic drawing illustrating a process of displaying a real time attribute mark of a picture according to still another embodiment of the present invention. What's different from FIG. 2(b) is the process of generating real time attribute mark 204 is done by the service provider 200 instead of the picture viewer 220. After generating the real time attribute mark, the service provider 200 distributes 209 the real time attribute mark to the picture viewer 220, for example combines the real time attribute mark and the picture to form a picture having the real time attribute mark and then sends it. The picture viewer 220 receives 221 the picture having the real time attribute mark and displays 226 it. This helps the situation where the picture viewer 220 is only capable of receiving and displaying a picture, for example a traditional TV.

Figure 3A:
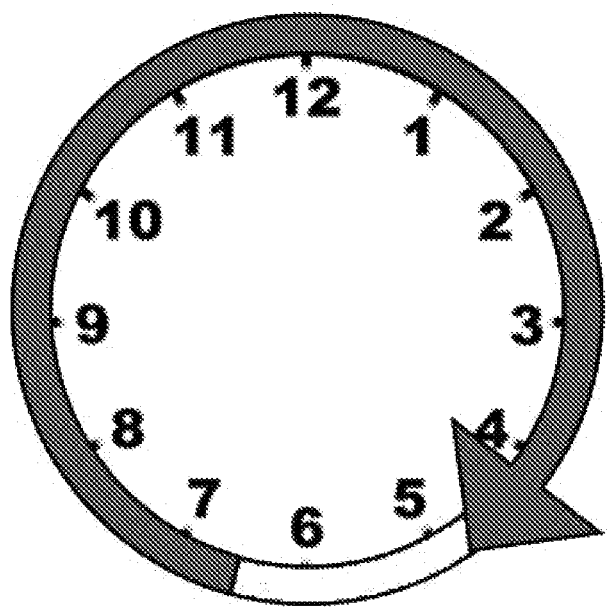
FIGS. 3(a) and 3(b) illustrate two samples of real-time attribute mark.

FIGS. 3(a) and (b) illustrate two samples of real time attribute mark on an analog clock according to an embodiment of the invention. As shown in FIG. 3(a), a deep color arrow, for example a red color arrow, is used as the real time attribute mark. In detail, the clock on which the real time attribute mark is displayed is set at the scale of 60 minutes. The arrow head of the deep color arrow indicates the current time, for example the 24th minute as shown, and the arrow tail of the deep color arrow indicates the picture taking time, i.e., the time when the picture was taken, for example the 33th minute of the last hour. The length of the arrow indicates the time interval between the picture taking time and the current time, i.e., 51 minutes as shown in FIG. 3(a).

Figure 3B:
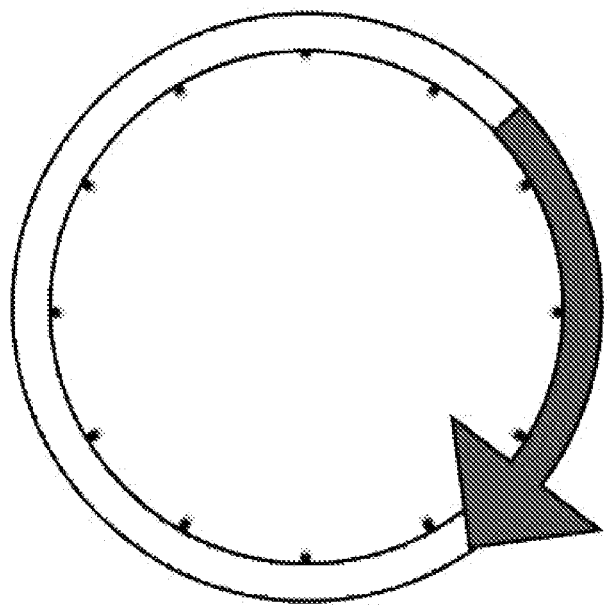

FIG. 3(b) illustrates another sample real time attribute mark on the analog clock. As shown in FIG. 3(b), the same deep color arrow is used as the real time attribute mark. Similar to FIG. 3(a), from the real time attribute mark as shown in FIG. 3(b), it can be determined that the current time is the 24th minute from the arrow head of the deep color arrow while the picture taking time is the 8th minute of the same hour from the arrow tail of the deep color arrow, and it can also be determined that the time interval between the picture taking time and the current time is 16 minutes from the length of the arrow.

In another embodiment, the scale of the clock may be set bigger or smaller, for example 12 hours or 60 seconds, according to the requirement of the user.

In another embodiment, any or all of the picture taking time, the current time and the time interval therebetween can be displayed with digits, for example "51 minutes" and "16 m" in the FIGS. 3(a) and 3(b) respectively.

Although a shape of an arrow is taken as an example in the above description, the present invention is not limited thereto. Those skilled in the art will understand that other shapes that can mark a beginning, an end and a duration or an interval are applicable to the present invention as well.

In addition, an authenticating process to determine whether the picture is a trustable picture may be added. That is, only for a trustable picture, the real time attribute mark will be displayed.

Figure 4:
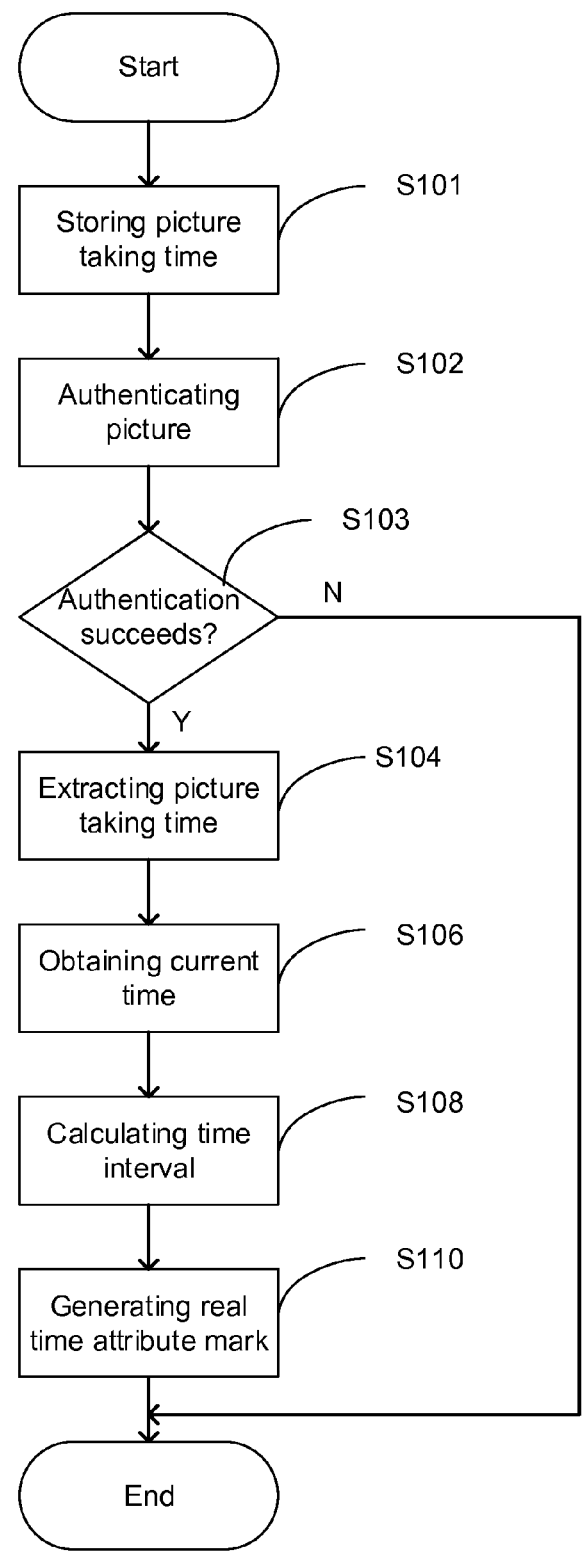
FIG. 4 is a flowchart illustrating a method for generating a real time attribute mark of a picture according to another embodiment of the present invention.

FIG. 4 is a flowchart illustrating a method for generating a real time attribute mark of a picture according to another embodiment of the present invention. Compared with the embodiment shown in FIG. 1, an authenticating process is further added.

In detail, at step S102 after step S101, whether the picture is a trustable photo is authenticated. And then at step S103, it is judged whether the authentication succeeds. If so, steps S104-S110 will be performed, otherwise the process will end.

The detailed process of the authenticating process will be described hereinafter with reference to FIGS. 5-7.

Figure 5:
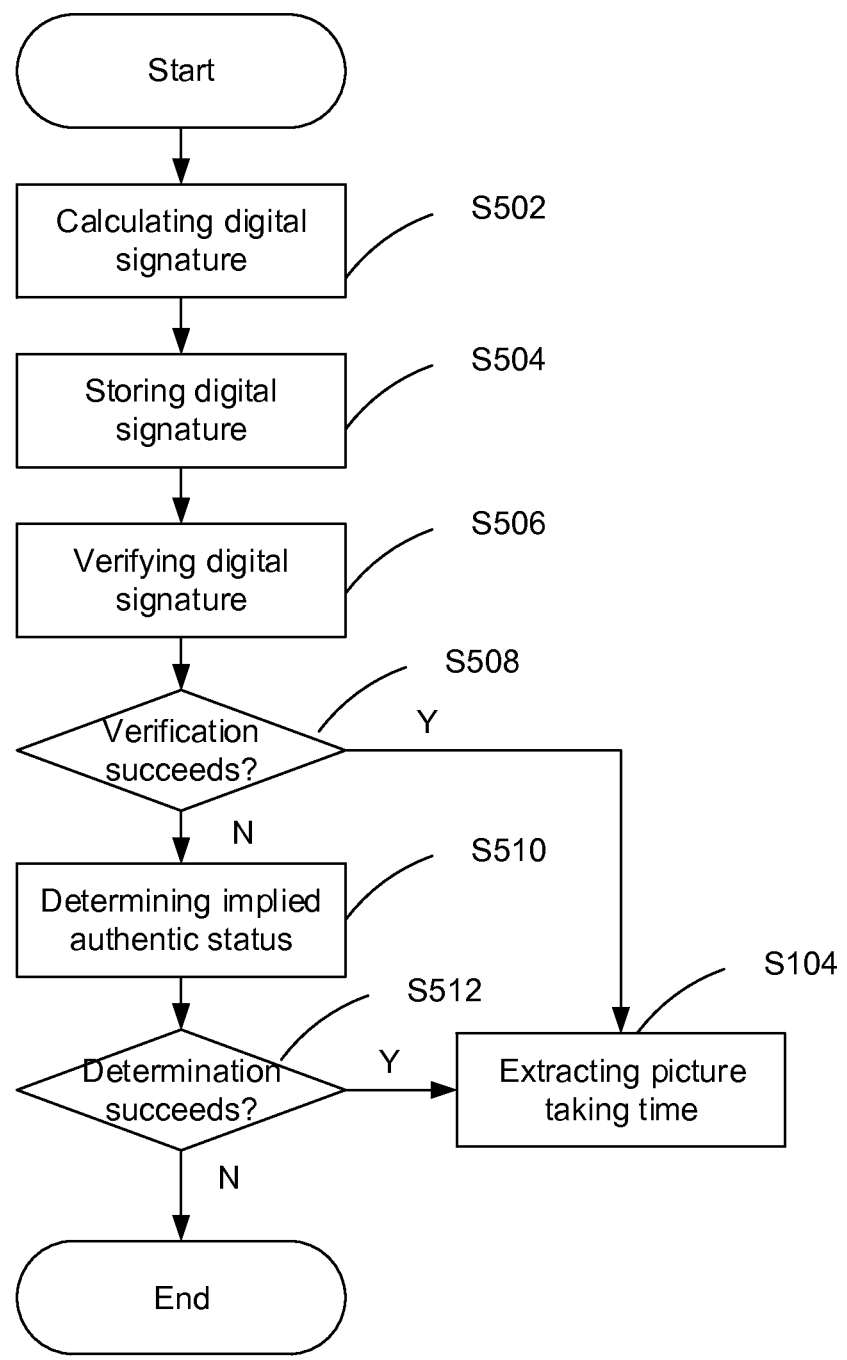
FIG. 5 is a flowchart of an authenticating process in FIG. 4.
Figure 6:
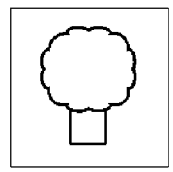
FIG. 6 illustrates various forms of picture changing.
Figure 6:
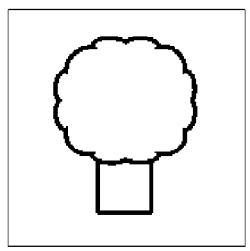
Figure 6:
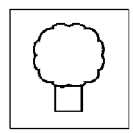
Figure 6:
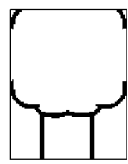
Figure 6:
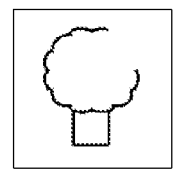
Figure 6:
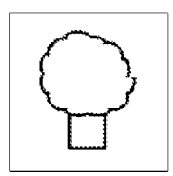
Figure 6:
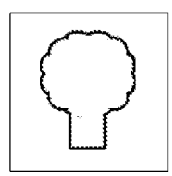

FIG. 5 is a flowchart of an authenticating process in FIG. 4.

As shown in FIG. 5, at step S502, a first digital signature is calculated based on photo data corresponding to a photo to obtain first signature data. Here, the photo is an original version of the picture.

At step S504, the first signature data is stored with the photo data.

At step S506, signature verification is implemented. For example, picture data is extracted from a picture file corresponding to the picture, and a second digital signature is calculated based on the extracted picture data to obtain second signature data corresponding to the picture, and then the second signature data corresponding to the picture is compared with the first signature data which is generated at step S502 and is stored with the photo data at step S504.

At step S508, it is determined whether the verification succeeds, for example if the second digital signature calculated at step S506 is the same as the first digital signature calculated at step S502. If so, the picture is an original photo and is thus a trustable picture, then step S104 in FIG. 4 will be performed.

If the verification fails, it means the picture is not an original photo. However, in some situations, although the picture is not an original photo, it is just a simple change of the original photo, for example being enlarged or shrunk. In these situations, the picture can be deemed as a trustable picture also. Thus, if the verification fails, an implied authentic status may be further determined at step S510. The details of the determination process will be described below with reference to FIGS. 6 and 7. If it is judged that an implied authentic status has been successfully determined at step S512, the picture is deemed as a trustable picture and then step S104 in FIG. 4 will be performed.

As described above, a photo which is edited in certain forms, for example, it is shrunk, or enlarged, or cropped, or cut at the edge, etc., that the resultant picture doesn't add any new information other than what's already in the original picture, can obtain an implied authentic status based on the original photo to indicate it is still a trustable picture. For example, FIG. 6 illustrates various forms of changing a picture 601. Picture 612 is 1.5 times enlarged. Picture 614 is 0.75× shrunk. Picture 616 is cropped. Picture 618 is cut in the upper right corner. These changes all cause changes in the photo data and the digital signature on the original data will fail verification. But in the human visible form, they won't cause any misinformation to a viewer. They are trustable and can be assigned an implied authentic status. But the changes in picture 622, i.e. moving the upper right edge inward and changing the tree crown, and the changes in picture 624, i.e., omitting the intersection line between the tree crown and the trunk, alter what the original picture represents. They will not get an authentic status.

Figure 7:
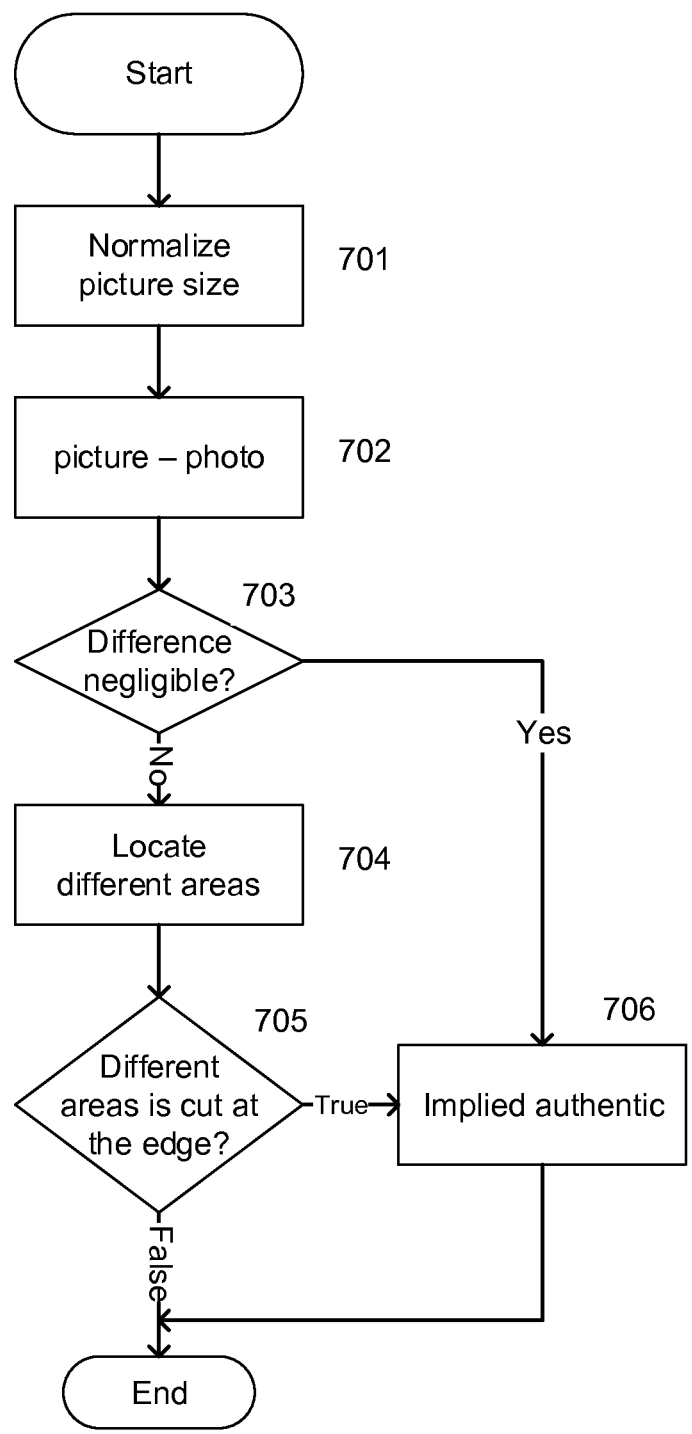
FIG. 7 illustrates detailed steps of determining implied authentic status in FIG. 5.

FIG. 7 illustrates detailed steps of determining implied authentic status in FIG. 5. In an embodiment, the changed picture is normalized 701 to the same size of the original photo. The difference between the picture and the original photo is calculated 702, for example, by subtraction, or xor (exclusive or) operation. Then the difference is checked 703 if it's negligible, if so, the implied authentic status is determined and assigned 706, and then step S104 in FIG. 4 will be performed. For the sample pictures 612 and 614 in FIG. 6, the difference is negligible and they can pass the check in 703. For the other pictures in FIG. 6, the difference will be too big to be negligible and fail the check in 703.

In an embodiment, after the check in 703 fails, the areas with the big difference are located 704, and checked 705 if they are cut at the edge of the original photo and missed in the picture. If so, it means the picture is only smaller than the original photo but whatever remained in the picture is the same as the original photo, so the implied authentic status can also be determined and assigned 706, and then step S104 in FIG. 4 will be performed. This situation applies to picture 618. With certain object extraction algorithms in advanced image processing, which is beyond the scope of this invention, picture 616 can also be processed and assigned an implied authentic status. In contrast, if the check in 705 fails, for example for pictures 622 and 624 shown in FIG. 6, implied authentic status will not be assigned.

According to this embodiment, the real time attribute mark will be displayed only for trustable pictures, thus the user can avoid possible wrong actions due to a fake picture.

Figure 8:
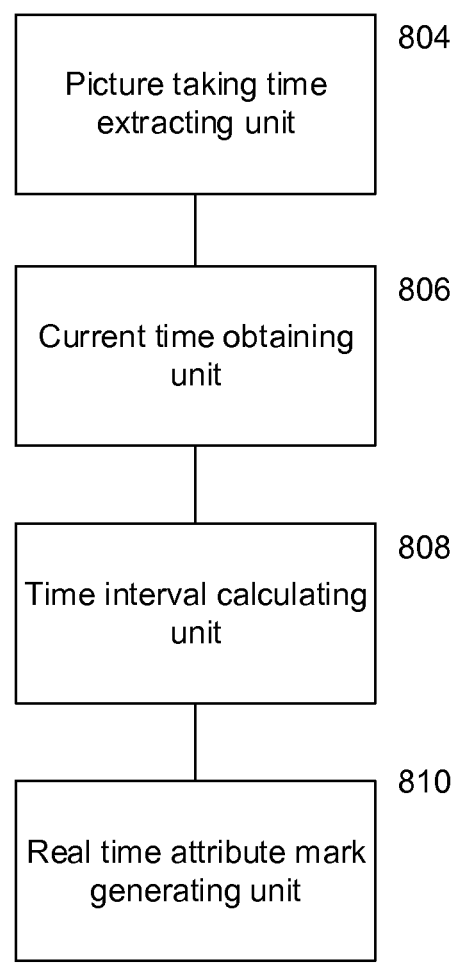
FIG. 8 illustrates schematic structure of an apparatus for generating a real time attribute mark of a picture according to an embodiment of the present invention.

FIG. 8 illustrates schematic structure of an apparatus for generating a real time attribute mark of a picture according to an embodiment of the present invention.

As shown in FIG. 8, an apparatus for generating a real time attribute mark of a picture according to an embodiment of the present invention comprises a picture taking time extracting unit 804, a current time obtaining unit 806, a time interval calculating unit 808 and a real time attribute mark generating unit 810.

The picture taking time extracting unit 804 extracts a picture taking time indicating when a picture was taken or created from picture data corresponding to the picture. The picture taking time is stored in advance in the picture data corresponding to the picture after the picture was taken.

The current time obtaining unit 806 obtains a current time.

The time interval calculating unit 808 calculates a time interval between the picture taking time and the current time by subtracting the picture taking time from the current time.

The real time attribute mark generating unit 810 generates a real time attribute mark indicating the time interval.

Figure 9:
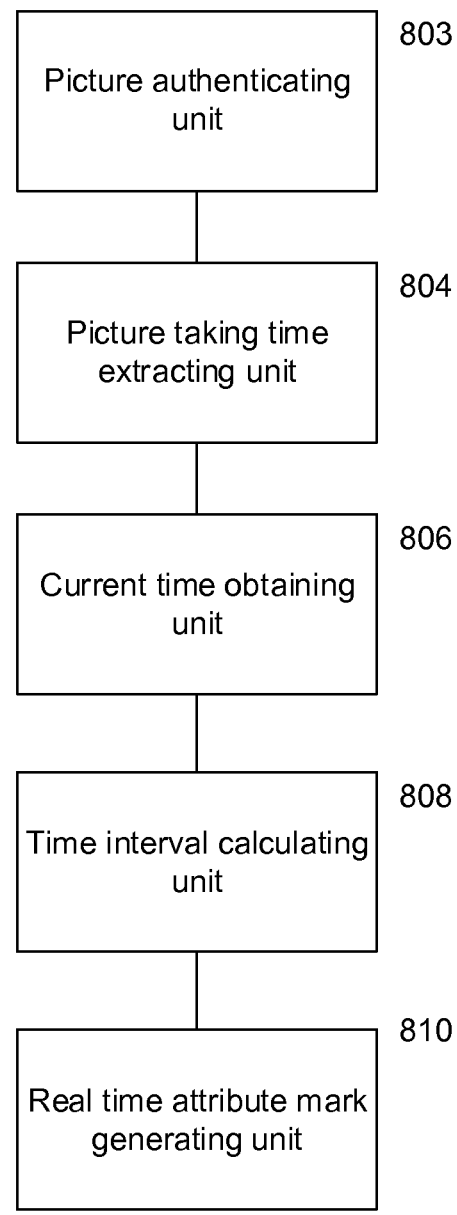
FIG. 9 illustrates schematic structure of an apparatus for generating a real time attribute mark of a picture according to another embodiment of the present invention.

FIG. 9 illustrates schematic structure of an apparatus for generating a real time attribute mark of a picture according to another embodiment of the present invention.

As shown in FIG. 9, compared with the embodiment shown in FIG. 8, a picture authenticating unit 803 for authenticating whether the picture is a trustable picture is further included. According to this embodiment, the real time attribute mark will be displayed only for trustable pictures.

Figure 10:
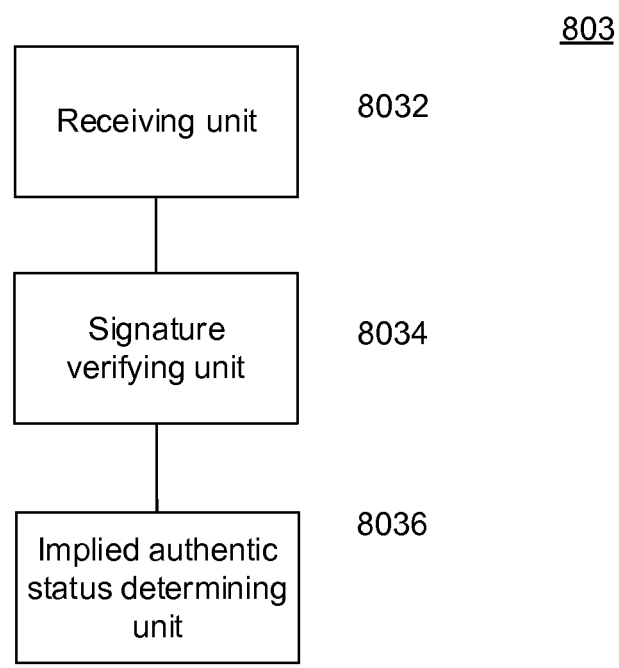
FIG. 10 illustrates schematic structure of a picture authenticating unit in FIG. 9.

FIG. 10 illustrates schematic structure of the picture authenticating unit 803 in FIG. 9. As shown in FIG. 10, the picture authenticating unit 803 includes a receiving unit 8032, a signature verifying unit 8034 and an implied authentic status determining unit 8036.

The receiving unit 8032 receives the picture file.

The signature verifying unit 8034 extracts photo data from the picture file, and calculates a digital signature based on the extracted photo data, and then compares the calculated digital signature with the signature data included in the picture file.

The implied authentic status determining unit 8036 determines an implied authentic status for the picture data if the signature verification implemented in the signature verifying unit 8034 fails. The details of the process of determining an implied authentic status for the picture data has been described above with reference to FIGS. 6 and 7 and thus is omitted to reduce redundancy.

Figure 11:
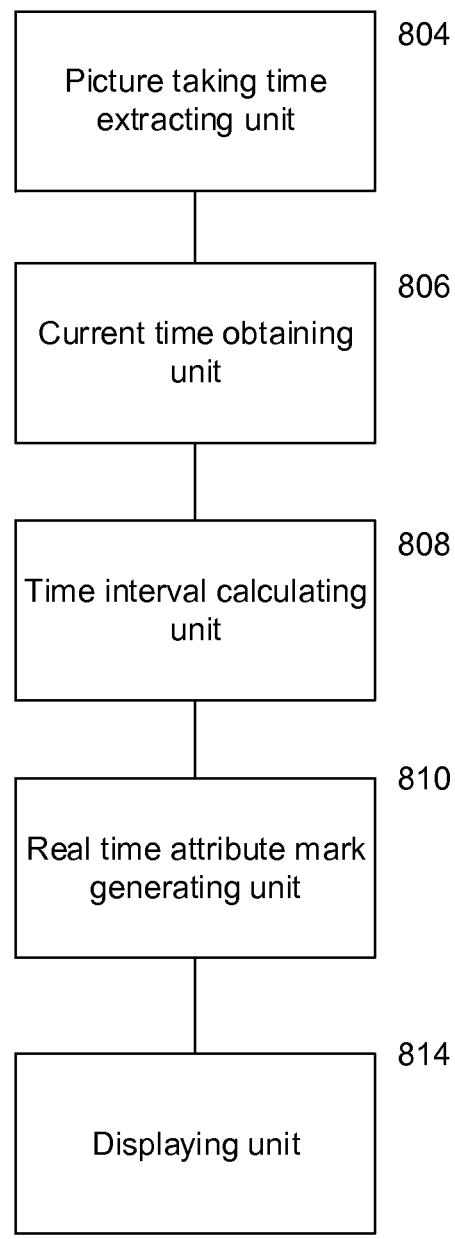
FIG. 11 illustrates schematic structure of an apparatus for generating a real time attribute mark of a picture according to still another embodiment of the present invention.

FIG. 11 illustrates schematic structure of an apparatus for generating a real time attribute mark of a picture according to still another embodiment of the present invention. Compared with the embodiment shown in FIG. 8, a displaying unit 814 is further included to display the generated real time attribute mark.

Figure 12:
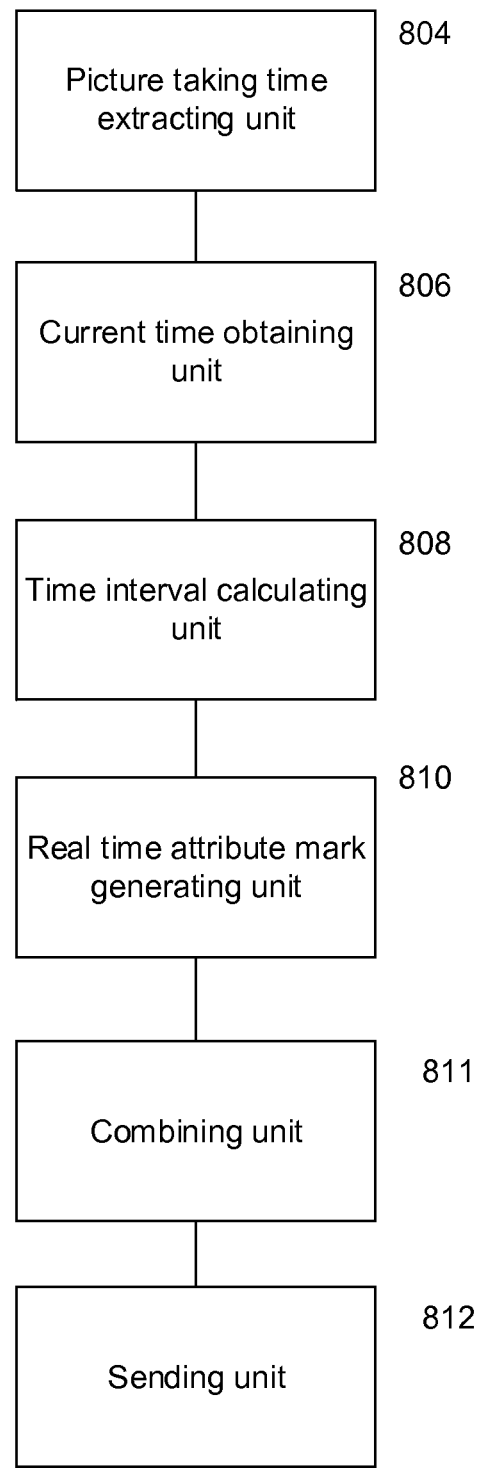
FIG. 12 illustrates schematic structure of an apparatus for generating a real time attribute mark of a picture according to yet another embodiment of the present invention.

FIG. 12 illustrates schematic structure of an apparatus for generating a real time attribute mark of a picture according to yet another embodiment of the present invention. Compared with the embodiment shown in FIG. 8, a combining unit 811 and a sending unit 812 are further included. The combining unit 811 combines the real time attribute mark and the picture to form a picture having the real time attribute mark. The sending unit 812 sends the picture having the real time attribute mark to an external device (not shown) for displaying.

Although the picture taking time is taken as an example in the above description, the present invention is not limited thereto. Those skilled in the art will understand that other time is applicable to the present invention as well.

The real time attribute is not limited to being displayed together with a picture, it can be displayed with any information or data to indicate the real time attribute of the information or data, for example, a clip of video, text news or events.

The apparatus for generating a real time attribute mark of a picture can be any device that is capable of receiving a picture file over a connection, for example, Bluetooth, mobile data network, or Wi-Fi, or TV channel etc., computing and verifying a digital signature based on given data, and displaying a picture, for example, a computer, a camera, a phone, digital glasses, a tablet, a TV, or an in-car head unit etc.

With the embodiments of the present invention, when a picture is to be displayed, a real time attribute mark indicating the time interval between the picture taking time and the current time is generated and can be further displayed visually, thus a user can get the information of the time interval directly and there is no need to check the current time and calculate the time period, which provides much convenience for the user. Especially under the situation that the user is driving, the user can get the information relating to the road conditions and safety with minimum distraction, so as to avoid possible safety risk for the user.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and their equivalents.

What is claimed is:

1. A method for generating a real time attribute mark of a picture, comprising:
    authenticating whether the picture is a trustable picture, comprising:
        obtaining first signature data by calculating a first digital signature based on photo data corresponding to a photo which is an original version of the picture and storing the first signature data in a picture file corresponding to the picture;
        extracting the first signature data and picture data from the picture file corresponding to the picture;
        calculating a second digital signature based on the extracted picture data to obtain second signature data; and
        comparing the first signature data with the second signature data, and
    after determining that the picture is trustable, extracting a first time from picture data corresponding to the picture;
    obtaining a current time;
    calculating a time interval between the first time and the current time;
    generating a real time attribute mark indicating the time interval between the first time and the current time; and
    displaying the real time attribute mark on a display included in a tangible electric apparatus,
    wherein the real time attribute mark is an arrow on an analog clock.

2. The method of claim 1, wherein the first time is a picture taking time indicating when the picture was taken or created.

3. The method of claim 1, wherein the real time attribute mark further indicates the first time and the current time.

4. The method of claim 1, wherein an arrow head of the arrow indicates the current time, an arrow tail of the arrow indicates the first time, and a length of the arrow indicates the time interval.

5. The method of claim 1, further comprising determining an implied authentic status when a comparing result shows the first signature data is not the same as the second signature data.

6. A tangible electric apparatus for generating a real time attribute mark of a picture, comprising:
    a picture authenticating unit configured to authenticate whether the picture is a trustable picture, comprising:
        a receiving unit configured to receive picture file corresponding to the picture; and
        a signature verifying unit configured to extract photo data from the picture file, and calculate a digital signature based on the extracted photo data, and then compare the calculated digital signature with signature data included in the picture file, and
    a first time extracting unit configured to extract a first time from picture data corresponding to the picture after the picture authenticating unit determines that the picture is trustable;
    a current time obtaining unit configured to obtain a current time;
    a time interval calculating unit configured to calculate a time interval between the first time and the current time;
    a real time attribute mark generating unit configured to generate a real time attribute mark indicating the time interval between the first time and the current time; and
    a display configured to display the real time attribute mark,
    wherein the real time attribute mark is an arrow on an analog clock.

7. The tangible electric apparatus of claim 6, wherein the first time is a picture taking time indicating when the picture was taken or created.

8. The tangible electric apparatus of claim 6, wherein an arrow head of the arrow indicates the current time, an arrow tail of the arrow indicates the first time, and a length of the arrow indicates the time interval.

9. The tangible electric apparatus of claim 6, wherein the picture authenticating unit further comprises:
    an implied authentic status determining unit configured to determine an implied authentic status for the picture data if the signature verification implemented in the signature verifying unit fails.

* * * * *